United States Patent [19]
Stern

[11] Patent Number: 5,730,327
[45] Date of Patent: Mar. 24, 1998

[54] ARRANGEMENT FOR PORTIONING VISCOUS MATERIALS FROM A PACK

[75] Inventor: Leif Einar Stern, Lomma, Sweden

[73] Assignee: Asept International AB, Lund, Sweden

[21] Appl. No.: 633,815

[22] PCT Filed: Oct. 17, 1994

[86] PCT No.: PCT/SE94/00971

§ 371 Date: Jun. 17, 1996

§ 102(e) Date: Jun. 17, 1996

[87] PCT Pub. No.: WO95/10963

PCT Pub. Date: Apr. 27, 1995

[30] Foreign Application Priority Data

Oct. 18, 1993 [SE] Sweden .................... 9303419

[51] Int. Cl.⁶ .................... B65D 35/28
[52] U.S. Cl. .................... 222/82; 222/95; 222/105; 222/207
[58] Field of Search .................... 222/82, 95, 105, 222/107, 181.1, 183, 207, 215

[56] References Cited

U.S. PATENT DOCUMENTS

| | | | |
|---|---|---|---|
| 2,660,339 | 11/1953 | Koob | 222/105 |
| 2,772,817 | 12/1956 | Jauch | 222/207 |
| 4,249,675 | 2/1981 | Nilson | 222/207 |
| 4,401,239 | 8/1983 | Thomassen | 222/183 X |
| 4,515,294 | 5/1985 | Udall | 222/105 |
| 4,646,945 | 3/1987 | Steiner et al. | 222/207 |
| 4,776,495 | 10/1988 | Vignot | 222/207 |
| 4,828,150 | 5/1989 | Bottger et al. | 222/207 |
| 4,930,667 | 6/1990 | Holzner, Sr. | 222/207 X |
| 4,946,075 | 8/1990 | Lundbäck | 222/207 X |
| 4,961,508 | 10/1990 | Weimer et al. | 222/207 X |
| 4,974,753 | 12/1990 | Tucker et al. | 222/181.2 |
| 5,016,779 | 5/1991 | Williamson | 222/105 X |
| 5,083,678 | 1/1992 | Waring | 222/105 X |
| 5,248,066 | 9/1993 | Olson et al. | 222/105 X |
| 5,397,026 | 3/1995 | Mayes | 222/207 X |

*Primary Examiner*—Kenneth Bomberg
*Attorney, Agent, or Firm*—McCormick, Paulding & Huber

[57] ABSTRACT

The present invention relates to an arrangement for portioning or dispensing viscous material from a pack, whereby the pack is positionable in an outer container and a portioning or dispensing unit includes a non-return valve which prevents the material from flowing back to the pack during portioning or dispensation. For being able to quickly place the pack in the outer container and quickly and safely lock a retaining portion as well as ensure than vital valve members of the non-return valve are not damaged during handling and operation of the portioning unit, the outer container is divided in a special way into two container members, whereby retaining members of the retaining device are integrated in the container members and whereby the valve seat of the non-return valve is surrounded by the retaining members of the retaining device.

22 Claims, 5 Drawing Sheets

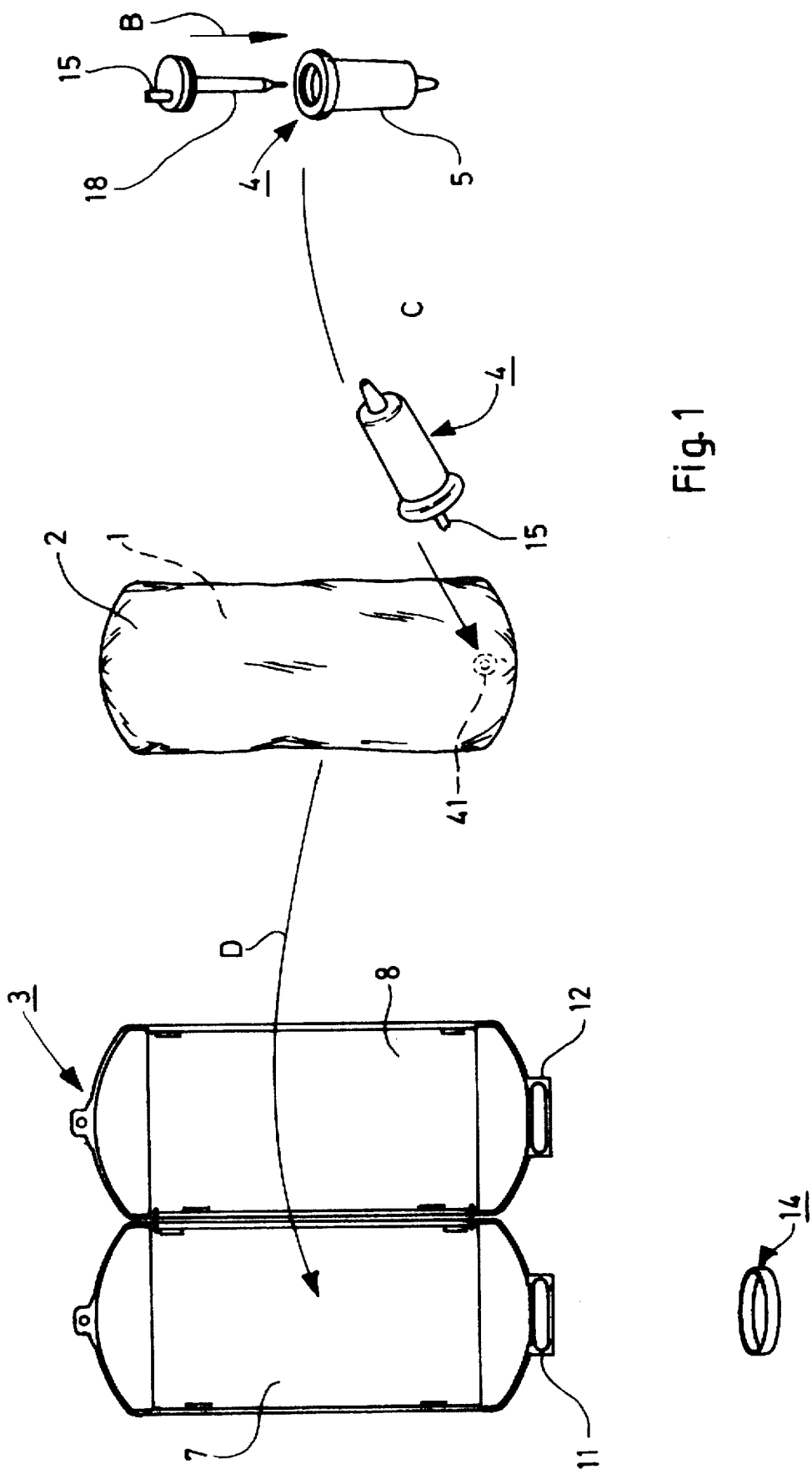

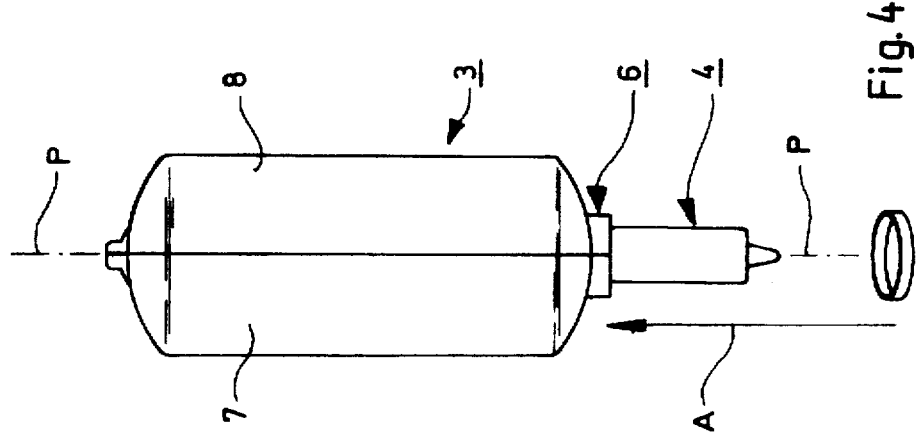
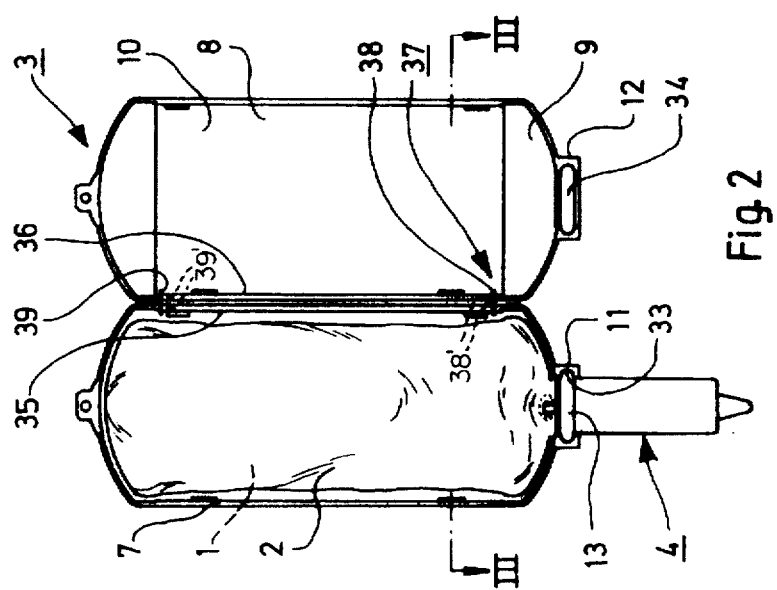
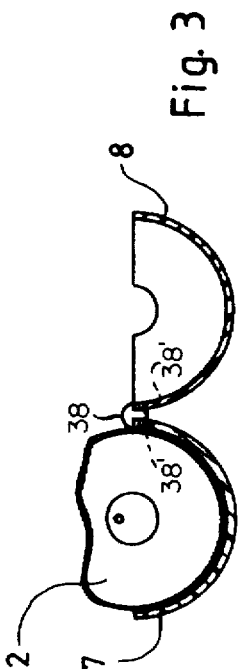

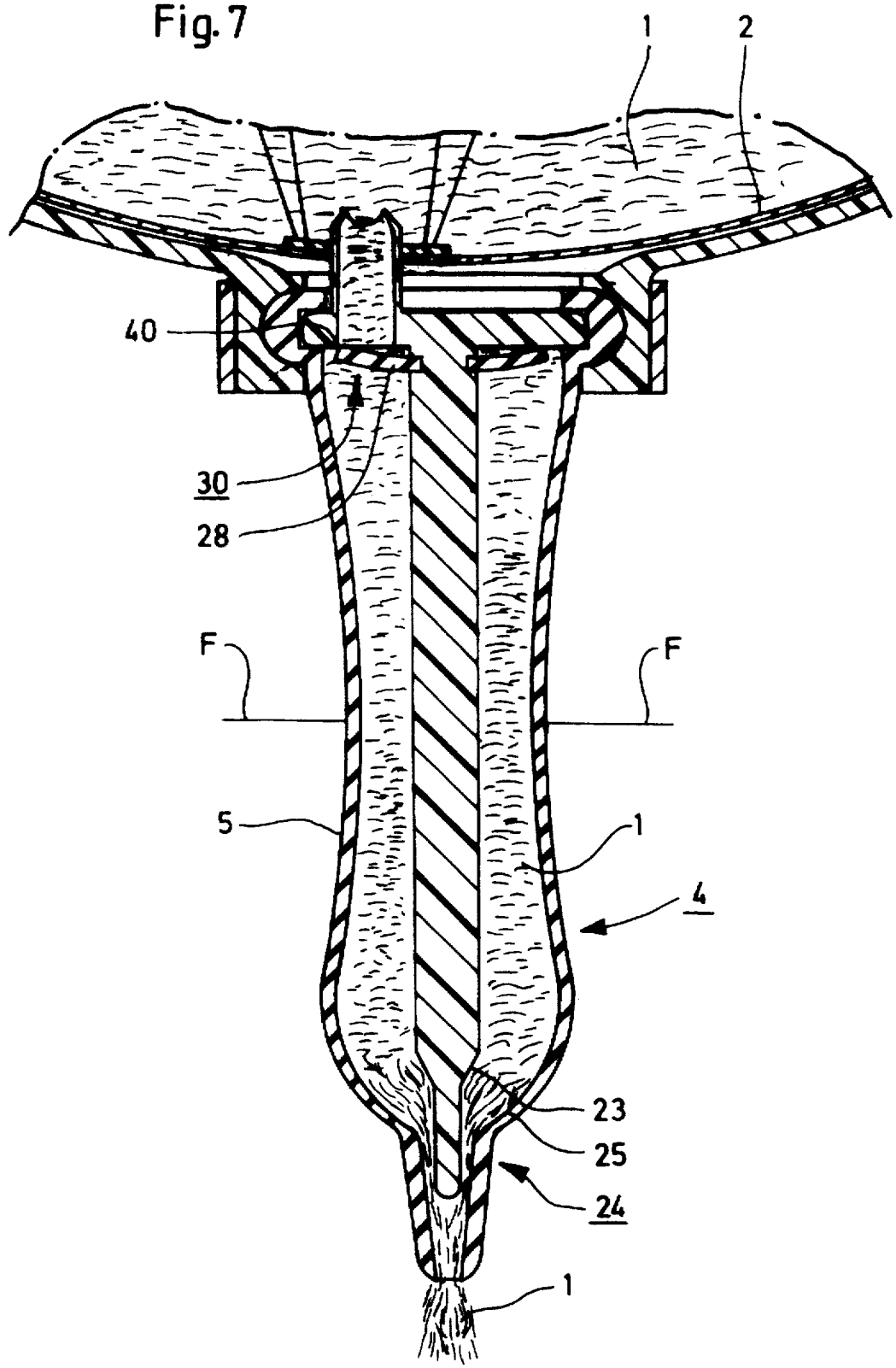

ARRANGEMENT FOR PORTIONING VISCOUS MATERIALS FROM A PACK

BACKGROUND OF THE INVENTION

The present invention relates to an arrangement for portioning viscous material, preferably foodstuff, e.g. ketchup or mustard, from a pack, preferably a plastic bag of flexible material, whereby a portioning means is connectable with the pack so that viscous material can be dispensed therefrom by means of said portioning means, preferably by gripping and compressing an elastic part thereof, whereby said portioning means includes a non-return valve having a valve seat and a valve means cooperating therewith and being adapted to prevent material from flowing back from the portioning means to the pack when said portioning means is compressed for dispensing material therefrom, and whereby the pack is positionable in an outer container so that the portioning means is directed downwards therefrom.

Prior art outer containers of said type are expensive to manufacture and they do not permit quick exchange of empty packs for new such packs. Furthermore, simple retaining devices are lacking, which can be brought to quickly and easily retain the upper end of the portioning means relative to the outer container without the risk for loosening or damaging said portioning means when it is handled manually for dispensing material from the pack.

The object of the present invention has been at first hand to eliminate these problems and this is arrived at by providing the device defined above.

SUMMARY OF THE INVENTION

By means of these characterizing features it is attained that the outer container as well as the retaining device consists of a few easily manufactured members. Furthermore, the measure to place a new pack in the outer container and locking the portioning means in relation thereto, is facilitated. The portioning means can namely be brought to automatically take an exact position relative to the retaining device when the pack is placed in the outer container such that said portioning means can be retained by means of the retaining device by simply closing the outer container. Additionally, the retaining device can protect vital members of the nonreturn valve forming part of the portioning means when said retaining device retains said portioning means such that said members are not damaged during manual handling of the portioning means for dispensing material from the pack.

BRIEF DESCRIPTION OF THE DRAWINGS

FIG. 1 schematically illustrates all major components forming part of the arrangement according to the invention located beside each other before assembly thereof;

FIG. 2 with a plan view illustrates an outer container forming part of the arrangement according to the invention and which is open and wherein a pack with a portioning means is located;

FIG. 3 is a section along the line III—III through the arrangement of FIG. 2;

FIG. 4 with a plan view illustrates the arrangement according to the invention, whereby the outer container is closed;

FIG. 7 is the same section through the portioning means as in FIGS. 5 and 6, but during dispensing of material.

DETAILED DESCRIPTION OF THE PREFERRED EMBODIMENTS

Figure 5:
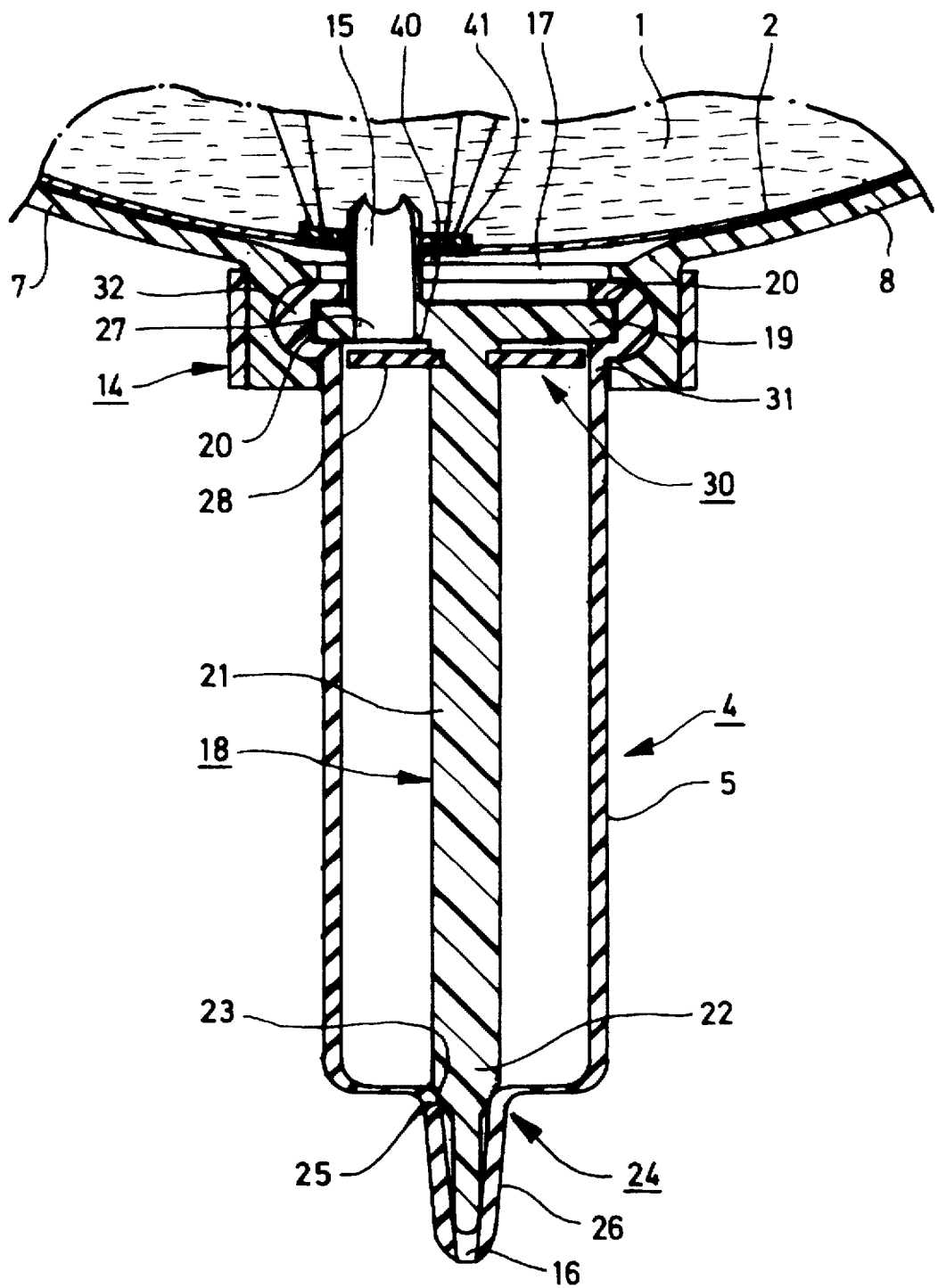
FIG. 5 is a vertical section through a portioning means forming part of the arrangement of the invention.

The portioning or dispensing device illustrated in the drawings is adapted for portioning or dispensing viscous materials 1, preferably foodstuff such as ketchup or mustard, from a pack 2, preferably a thinwalled plastic bag of flexible material. The pack 2 is positionable, e.g. suspendable at the top, in an outer container 3, which is suspendable or positionable at a location at which dispensing of the viscous material 1 occurs, e.g. in a kiosk, in a snack bar or in a restaurant.

The portioning device has a portioning or dispensing means 4, preferably including a compressible hose 5 of elastic material. This portioning means 4 can be connected with the pack 2 so that viscous material 1 can be dispensed therefrom by means of the portioning means 4.

The outer container 3 has down below a retaining device 6 for retaining the portioning means 4 at said container so that said portioning means is directed downwards from said outer container 3.

The outer container 3 is divided into two container members 7, 8 along a plane P (see FIG. 4) extending between its lower and upper portions 9 and 10. The container members 7, 8 are movable relative to each other, preferably articulately connected with each other, in such a way that the outer container 3 can be opened and closed by changing their mutual positions. Furthermore, the retaining device 6 includes a retaining member 11 which is provided on one of the container members 7 and another retaining member 12 which is provided so that both retaining members 11, 12 together can be brought to retain the portioning means 4 at the outer container 3. Said other retaining member 12 is preferably mounted on the other container member 8, but can also be mounted on said first container member 7, e.g. as a movable clamp member, or being a separate member which can be positioned in another suitable way for retaining the portioning means 4 at the outer container 3.

At least one of the container members 7 and/or 8 is preferably designed such that the pack 2 can be placed therein when the outer container 3 is open (see FIGS. 2 and 3, wherein the pack 2 is located in the container member 7).

Hereby, a retaining portion 13 of the portioning means 4 is preferably positionable in the retaining member (here retaining member 11) of the same container member (here container member 7). As is apparent from the figures, one of the retaining members 11 can be mounted on one of the container members 7 and the other retaining member 12 mounted on the other container member 8 such that said retaining members 11, 12 are brought into retaining positions (see FIG. 4) to retain the portioning means 4 by bringing said container members 7, 8 into positions at which they define a closed outer container 3 and locking them in these positions relative to each other.

For locking the container members 7, 8 relative to each other when said members define a closed outer container 3 and for locking also the retaining members 11, 12 relative to each other when these latter members retain the portioning means 4, a locking means 14, preferably a lock ring, can be provided, preferably threaded (see arrow A in FIG. 4) onto the retaining device 6 when the outer container 3 is closed.

On the insert member 18 and preferably the mounting member 19 there may be provided a coupling device 15 which can be connected with the pack 2 for discharge of viscous material therefrom to the portioning means 4 before said pack 2 is encased in the outer container 3 and preferably before said pack 2 has been placed (see arrows C, D in FIG. 1) in any of the container members 7 or 8.

The compressible hose 5 has in one end a portioning or dispensing member 26 with a dispensing opening 16 and in another end an insert opening 17 through which an insert member 18 belonging to the portioning means 4 is insertable into the compressible hose 5 (see arrow B in FIG. 1).

The coupling device 15 can be connected with the insert member 18 in such a way that one can connect said device with the pack 2 when the insert member 18 is provided in the portioning means 4 (see FIG. 1).

Furthermore, the coupling device 15 is preferably a pipe piece provided on the mounting member 19 and of such length that is projects out from the insert opening 17 of the compressible hose 5 when the insert member 18 is provided in said compressible hose. Such a coupling device 15 can also be used for punching or making holes in the pack 2 when said device is connected.

The mounting member 19 is preferably locatable in the portioning means 4 adjacent to the insert opening 17 thereof. This mounting member 19 may consist of a circular plate which is insertable into a circular mounting groove 20 preferably provided in the compressible hose 5, and which preferably is retained in said groove while those portions of the elastic material of the hose which are brought to deflect resiliently when the circular plate is inserted into the circular mounting groove 20, spring back or return to their original shape.

A rod 21 may extend from central portions of the mounting member 19 and an end portion 22 of said rod defines a valve seat 23 for a portioning or dispensing valve 24 within the dispensing opening 16. The valve body 25 of the dispensing valve 24 may be formed by those parts of the dispensing member 26 which surround the end portion 22 of the rod 21. A material intake opening 27 can be provided in the mounting member 19 for permitting intake of viscous material from the pack 2 to the interior of the compressible hose 5. This material intake opening 27 can be located laterally offset relative to those central portions of the mounting member 19 from which the rod 21 extends.

On the rod 21 adjacent to the mounting member 19 there may also be provided an valve means 28 of elastic material for a nonreturn valve 30. The mounting member 19 may define the valve seat 40 for the nonreturn valve 30 while the valve means 28 is provided to cooperate with the mounting member 19 around its material intake opening 27.

The portioning means 4, and preferably its compressible hose 5, may at a retaining end 31 be provided with an annular mounting flange 32 and at least one of the retaining members 11 and/or 12 can be provided with a retaining groove 33 and/or 34 for retention of the annular mounting flange 32. Additionally, the mounting groove 20 can be provided in the annular mounting flange 32. The mounting member 19 preferably extends out to the outer portions of the mounting groove 20 and preferably is of such rigid material that it can form an inner support for the portioning means 4 within the retaining device 6 and at the same time prevent said portioning means 4 from being pulled downwards therefrom.

At the container members 7, 8 of the outer container 3, a container member edge 35 which extends from a lower portion 9 to an upper portion 10 of one of the container members 7 and a container member edge 36 which extends from a lower portion 9 to an upper portion 10 of the other container member 8 may be connected with each other through a link device 37 which permits swinging together of said container members 7, 8 to define or form a closed or substantially closed outer container 3 (see FIG. 4) or apart to form an open outer container 3 (see FIG. 2).

This link device 37 may include at least two rings 38, 39 of which each ring is threaded through a hole 38', 38' in one of the container members 7 and a hole 39', 39' in the other of said container members 8. One of the rings 38 preferably is provided at the lower portion 9 of the container members 7, 8 and the other ring 39 at the top or upper portion 10 of said members.

Each container member 7, 8 and a retaining member 11, 12 provided thereon may be manufactured in one single piece and of the same material, e.g. plastic material. One container member 7 and the retaining member 11 provided thereon are identical or almost identical with the other container member 8 and the retaining member 12 provided thereon.

As is apparent from the figures, each container member 7, 8 defines half or substantially half the outer container 3 and each retaining member 11, 12 defines half or substantially half the retaining device 6. Furthermore, each container member 7, 8 can be designed as an oblong and shape permanent shell, from the lower portion 9 of which a retaining member 11 and 12 respectively, projects as a half pipe piece or similar.

It should also be mentioned that the pack 2 preferably has an inner coupling member 41 at which the coupling device 15 is insertable and which is adapted to retain said device.

Figure 6:
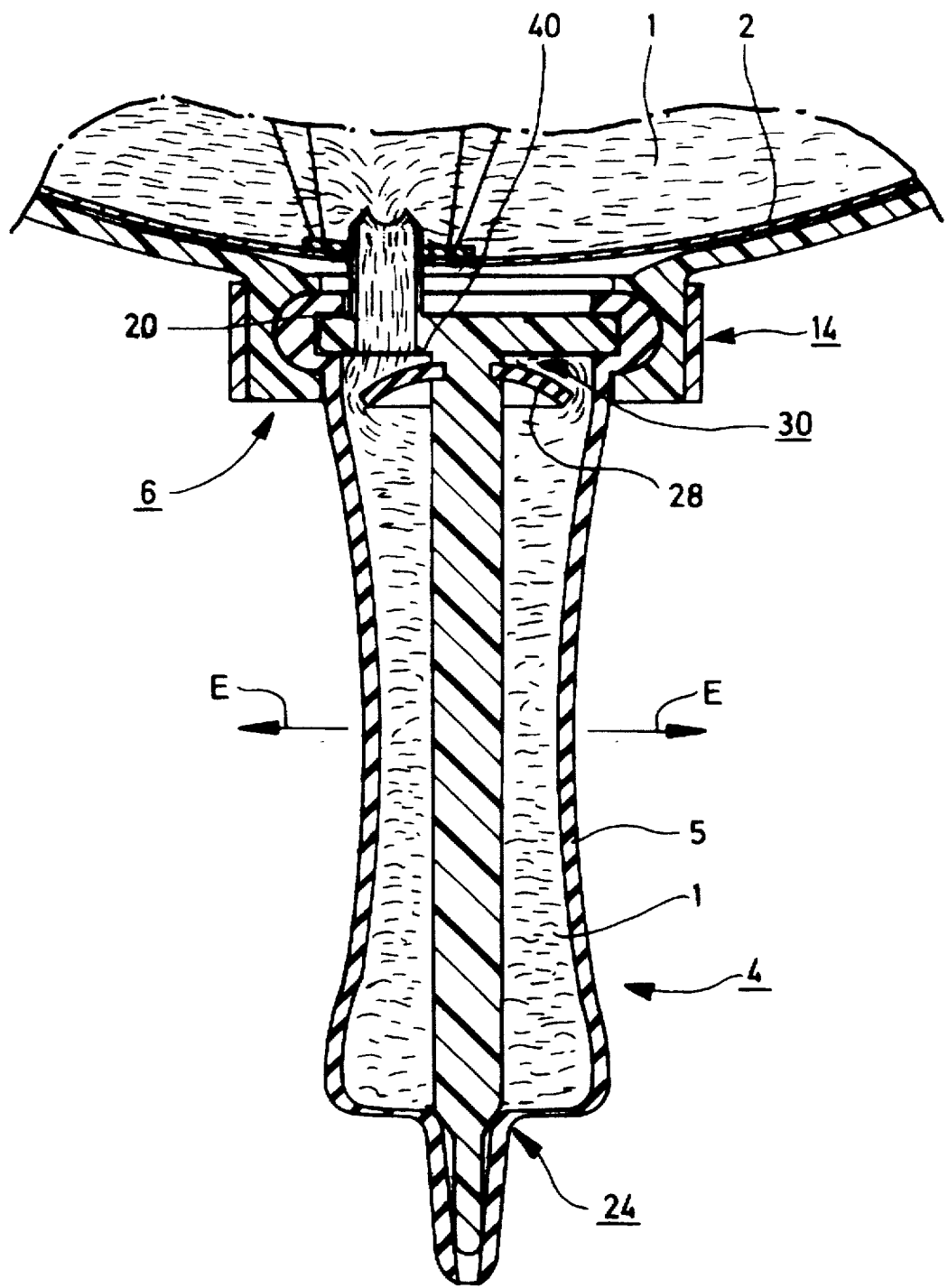
FIG. 6 is the same section through the portioning means as in FIG. 5, but during suction of material.

For dispensing material, material is initially fed into the portioning means 4 until said means is filled. Filling of the portioning means 4 occurs by gripping said means and "pumping" it by compressing or squeezing it and then release the grip. Since the portioning means 4 because of its elastic properties returns to its original shape (see arrows E in FIG. 6) when one releases the grip, a negative pressure is generated in said portioning means 4, whereby the nonreturn valve 30 is opened and material 1 is sucked from the pack 2 into the portioning means. This is repeated until the portioning means 4 is filled (see FIG. 6), whereby said portioning means is ready for portioning or dispense.

By compressing the portioning means 4 (see arrows F in FIG. 7) filled as stated above, the nonreturn valve 30 will close and prevent material 1 from flowing back from said portioning means to the pack 2. Instead, the dispensing valve 24 is opened (by bringing the dispensing member 26 of the hose 5 to "gape" and thereby leave the valve seat 23 of the dispensing valve 24) and material 1 dispensed from the portioning means 4 (see FIG. 7).

The arrangement illustrated in the drawings is handled so that when an empty pack 2 has been removed, the portioning means 4 is connected with a full pack 2 (see arrow C in FIG. 1). Thereafter, the pack 2 and the portioning means 4 connected therewith is placed in e.g. the container member 7 with the retaining portion 13 in its retaining position relative to the retaining member 11 (see FIG. 2). Then, the outer container 3 is closed, whereby the retaining portion 13 of the portioning means 4 will be located within the retaining device 6 and thus, at least also the valve seat 40 of the nonreturn valve 30. Hereby, the retaining device 6 will retain the retaining portion 13 relative to the outer container 3 and also protect the valve seat 40 of the nonreturn valve 30, i.e. in the embodiment shown, the mounting member 19 defining said valve seat 40.

Since in the embodiment shown, the valve means 28 of the nonreturn valve 30 is also located within the retaining portion 13 and thereby will be surrounded by the retaining device 6, the valve means 28 is here also protected by said retaining device, which means that the entire nonreturn valve 30 can be protected by the retaining device 6 at least when said valve is closed.

When the outer container 3 is closed and thus, the portioning means 4 is retained by the retaining device 6, the locking means 14 can be threaded onto said retaining device 6 through said portioning means 4, whereby the container members 7, 8 as well as the retaining members 11, 12 are locked in their closed positions. The outer container 3 is thus ready to be suspended or set up at its place of use with the portioning means 4 directed downwards.

The material guiding members or portions of the portioning means 4 are easily cleaned after daily use by removing the insert member 18 from the hose 5, whereafter each such member or portion is washed separately. The washing of the insert member 18 can be facilitated if there is a gap (see FIG. 5) between the valve means 28 and the mounting member 19 for easy access between said members. When the cleaning is finished, it is easy to reassemble the members for further use in cleaned condition.

The invention is not limited to the embodiment described above and illustrated in the drawings, but may vary within the scope of the following claims. As examples of alternative embodiments it can be mentioned that the container members 7, 8 can have another design than shown and they can eventually be entirely dismountable from each other instead of being articulately connected with each other, the retaining members 11, 12 of the retaining device 6 can be designed in other ways, e.g. can both members be located on the same container member, whereby one of the retaining members is movable so that it can be moved aside for positioning the portioning means 4 in the other and then moved back for locking said means to said other retaining member. One of the retaining members can also be completely removable from and securable to the other retaining member.

Furthermore, the locking means 14 can be designed in other ways than shown for locking the retaining members 11, 12 in their retaining positions and there may alternatively be at least one locking means for locking the container members 7, 8 when the outer container 3 is closed, whereby said latter locking means indirectly also can lock the retaining members 11, 12. There may also be provided one or more locking means for locking the container members 7, 8 and one or more other locking means for locking also the retaining members 11, 12. The coupling device 15 can have other shapes and be mounted in other ways than shown—it may e.g. be a flexible hose which is connected with the mounting member 19 or with the portioning means 4 in other ways. This hose may at an outer end be provided with a connecting and/or lancing or punching pipe which can be connected with the pack 2. The portioning means 4 can also be of another design than described above and this is applicable also to the pack 2.

I claim:

1. An arrangement for dispensing a viscous material, comprising:

a dispensing means having an elastic member and coupled to a pack so that the viscous material can be dispensed from the pack by said dispensing means by gripping and compressing the elastic member thereof, the dispensing means also includes a non-return valve having a valve seat and a valve means cooperating therewith to prevent material from flowing back from the dispensing means to the pack when said dispensing means is compressed for dispensing material therefrom, the dispensing means including a retaining portion;

an outer container for receiving the pack so that the dispensing means is directed downward from the outer container, the outer container divided into two container members along a plane extending between an upper and a lower portions of the outer container; and retaining means provided at the lower portion of the outer container for receiving the retaining portion of the dispensing means, the retaining means includes two retaining members of which one retaining member is provided at a lower portion of one container member, and the other retaining member is provided at a lower portion of the other container member, so that the retaining members together can be brought into retaining positions adjacent to one another for retaining the retaining portion of the dispensing means, the valve seat of the non-return valve being positioned within the retaining portion of the dispensing means so that said seat will be located within the retaining means within the retaining portion.

2. The arrangement according to claim 1, wherein the retaining portion of the dispensing means has an annular mounting flange and at least one of the retaining members of the retaining means is provided with a retaining groove which is engaged by the annular mounting flange of the retaining portion when the retaining members retain the dispensing means.

3. The arrangement according to claim 2, wherein the valve seat of the non-return valve comprises a mounting member.

4. The arrangement according to claim 3, wherein the mounting member forms part of an insert member within the dispensing means and includes the valve means which forms part of the nonreturn valve and cooperates with the valve seat.

5. The arrangement according to claim 4, wherein the valve seat is defined by the mounting member around a material intake opening defined by said mounting member to permit intake of material from the pack to the dispensing means.

6. The arrangement according to claim 1 wherein the valve seat is defined by a mounting member and consists of a circular plate which is received in a circular mounting groove in the elastic member of the dispensing means, the plate retained in said mounting groove.

7. The arrangement according to claim 1 wherein the dispensing means further comprises a rod which extends from a central portion of a mounting member defining the valve seat, an end portion of said rod defines a second valve seat for a dispensing valve within a dispensing opening which is defined by the elastic member of the dispensing means, a valve body of the dispensing valve formed by portions of the elastic member which surround the end portion of the rod, a material intake opening provided in the mounting member for permitting intake of the viscous material from the pack to an interior of the elastic member, the material intake opening laterally offset relative to the central portion of the mounting member from which the rod extends, and the valve means of the nonreturn valve provided on the rod adjacent to the mounting member.

8. The arrangement according to claim 1 wherein the valve seat of the nonreturn valve is defined by a mounting member, said mounting member includes a coupling device connected with the pack for discharge of material from the pack to the dispensing means.

9. The arrangement according claim 1 wherein the valve seat of the nonreturn valve is defined by a mounting member, said mounting member located at an insert opening provided in one end of the dispensing means.

10. The arrangement according claim 1 wherein at least one of the container members is formed to receive the pack when the container members are separated such that the outer container is open, so that the retaining portion of the dispensing means is located in the respective retaining member of the container member.

11. The arrangement according to claim 1 wherein the container members are positioned to define a substantially closed outer container position and a locking means is provided locking said container members in said closed position relative to each other.

12. The arrangement according to claim 1 further comprising a locking means provided on the retaining members when the outer container is closed for locking the retaining members of said retaining means in retaining positions and wherein said retaining members retain the dispensing means.

13. The arrangement according claim 1 wherein the valve seat of the non-return valve is defined by a mounting member having a coupling device to punch a hole in the pack and mounted so that said coupling device can be connected with the pack for discharge of the viscous material from the pack to the dispensing means.

14. The arrangement according to claim 13, wherein end of the dispensing means has an inserting opening through which a coupling device having a mounting member defining the valve seat is received, and the coupling device is connected with an insert coupling member of the pack to enable said coupling device to punch a hole in the pack and connect it therewith.

15. The arrangement according to claim 13, wherein the coupling device is a pipe piece provided on the mounting member and having a length to protrude from an insert opening of the dispensing means.

16. The arrangement according to claim 1 wherein the dispensing means comprises a compressible hose, the retaining portion having an annular mounting flange, at least one of the retaining members provided with a corresponding retaining groove for receiving the annular mounting flange of the compressible hose.

17. The arrangement according to claim 1 wherein a container member edge of one container member which extends from a lower portion to an upper portion of the one container member and a container member edge of the other container member which extends from a lower portion to an upper portion of the other container member are connected with each other through a link device which enables swinging together of said container members to define a substantially closed outer container or apart to form an open outer container.

18. The arrangement according to claim 17, wherein the link device includes at least two rings each threaded through a respective hole in one container member and a hole in the other container member with one ring provided at the lower portions of the container members and the other ring at the upper portions of said members.

19. The arrangement according to claim 1 wherein each container member and associated retaining member provided thereon are formed in one piece and of the same material, and that the one container member and the associated retaining member provided thereon have a shape substantially identical with a shape of the other container member and the associated retaining member provided thereon.

20. The arrangement according to claim 19, wherein each container member defines substantially half of the outer container and that each retaining member defines substantially half of the retaining means.

21. The arrangement according to claim 1 wherein each container member defines an oblong shell from a lower portion of which the respective retaining member protrudes as a half pipe piece.

22. The arrangement according to claim 1 wherein the dispensing means comprises a compressible hose which in one end has a dispensing end with a dispensing opening and in the opposite end has the retaining portion.

\* \* \* \* \*